Sept. 26, 1967     L. S. MICHELS     3,344,258
MATCHING IDENTIFICATION SYSTEM
Filed April 11, 1963     5 Sheets-Sheet 1
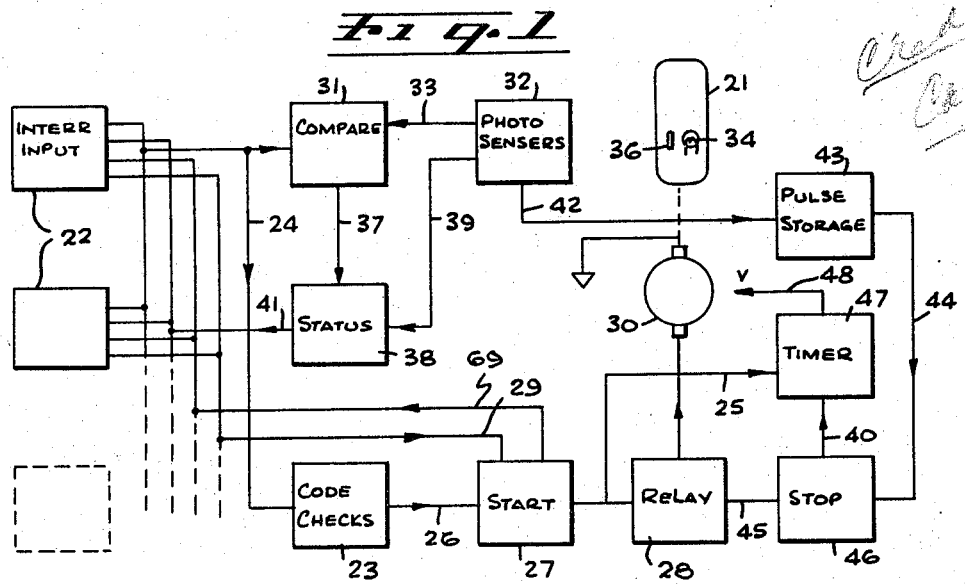
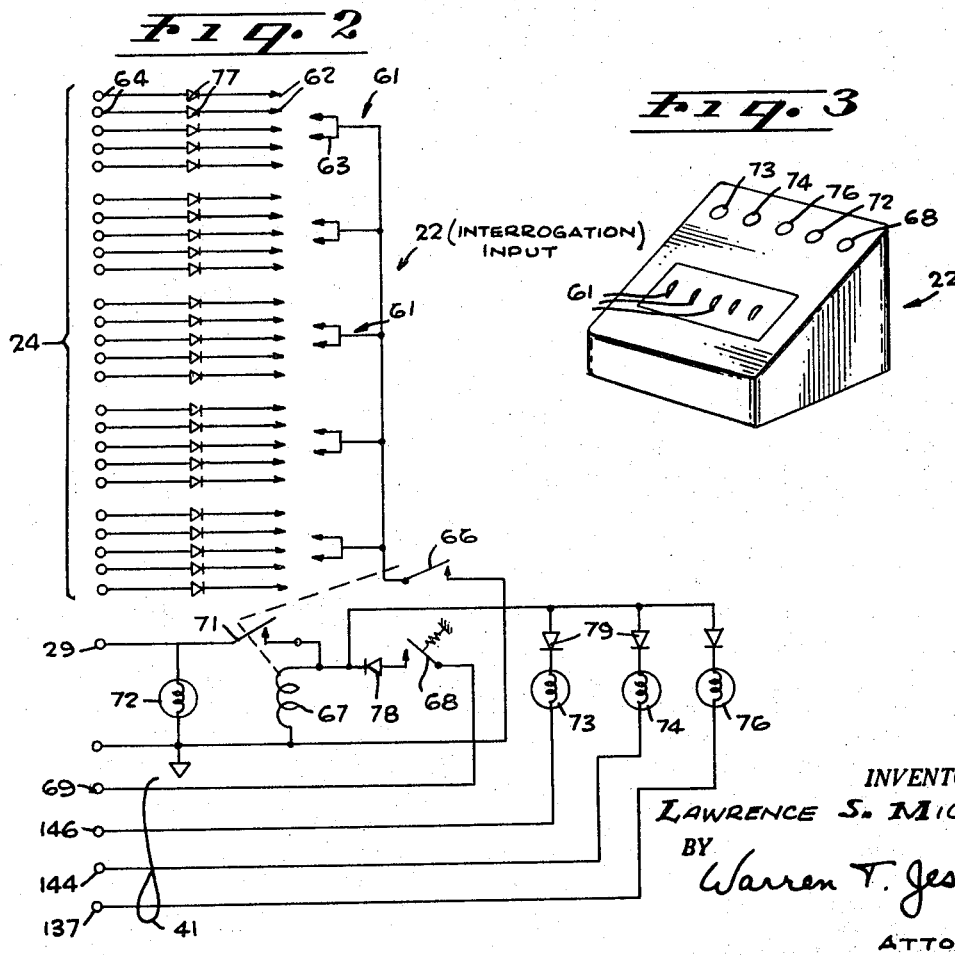
INVENTOR.
LAWRENCE S. MICHELS
BY Warren T. Jessup
ATTORNEY

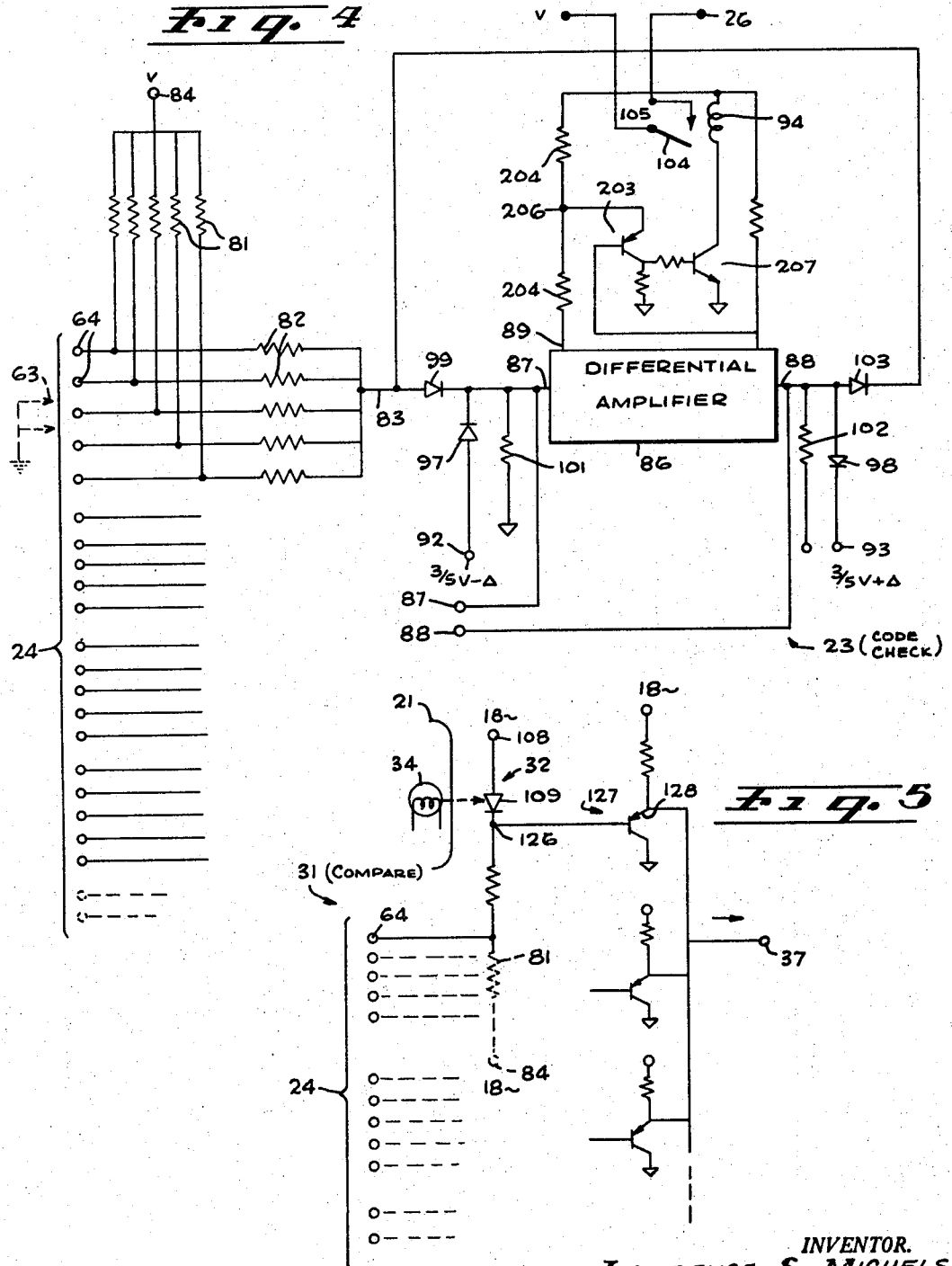

Sept. 26, 1967 L. S. MICHELS 3,344,258
MATCHING IDENTIFICATION SYSTEM
Filed April 11, 1963 5 Sheets-Sheet 3

INVENTOR.
LAWRENCE S. MICHELS
BY
Warren T. Jessup
ATTORNEY

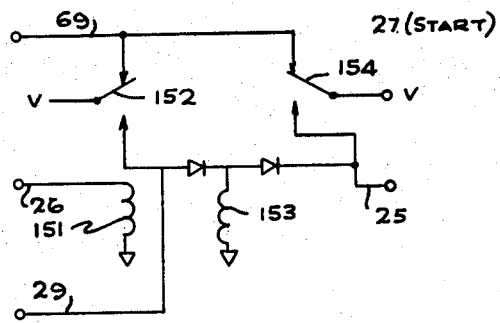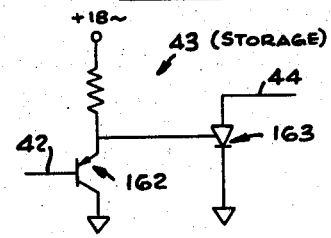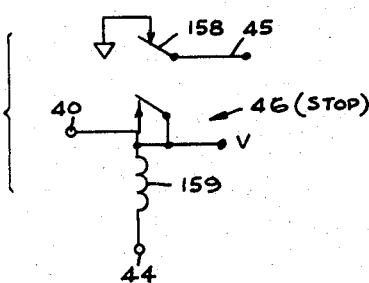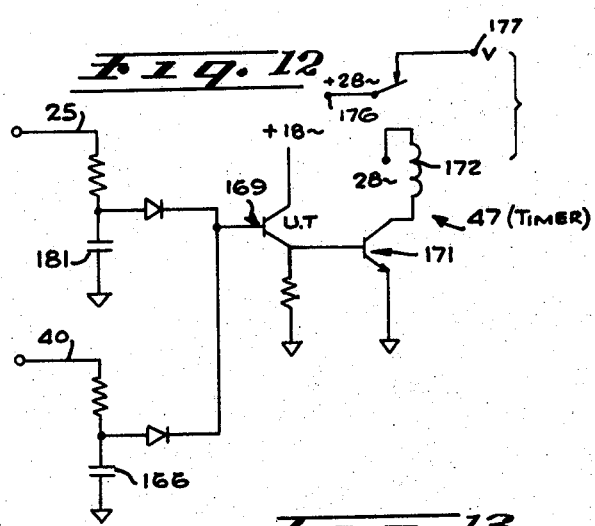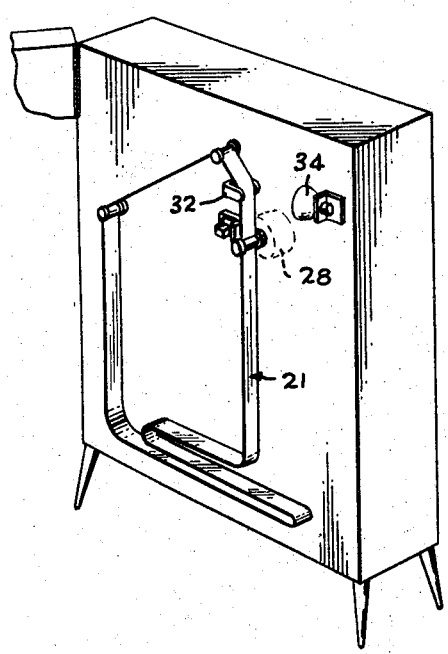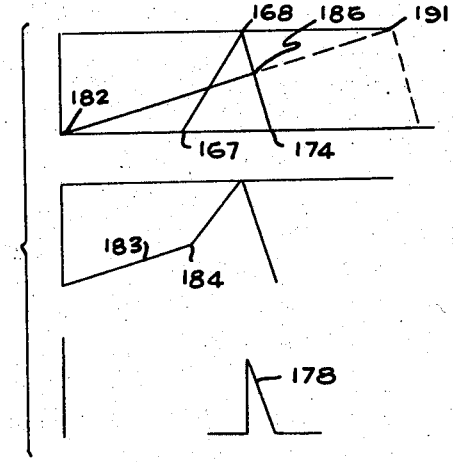

Sept. 26, 1967   L. S. MICHELS   3,344,258
MATCHING IDENTIFICATION SYSTEM
Filed April 11, 1963   5 Sheets-Sheet 5
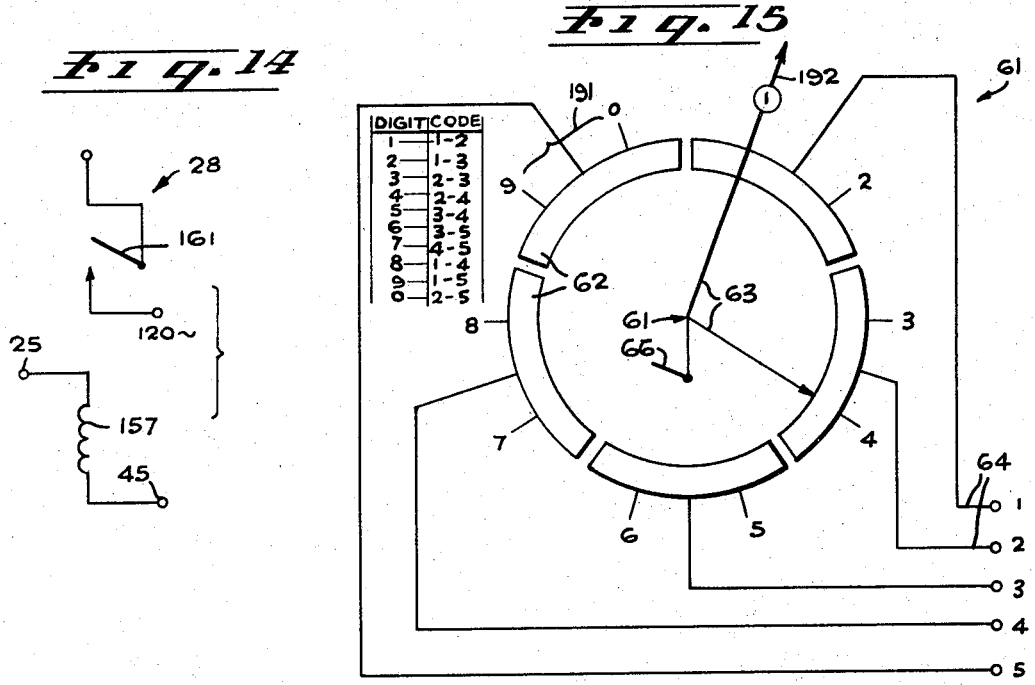
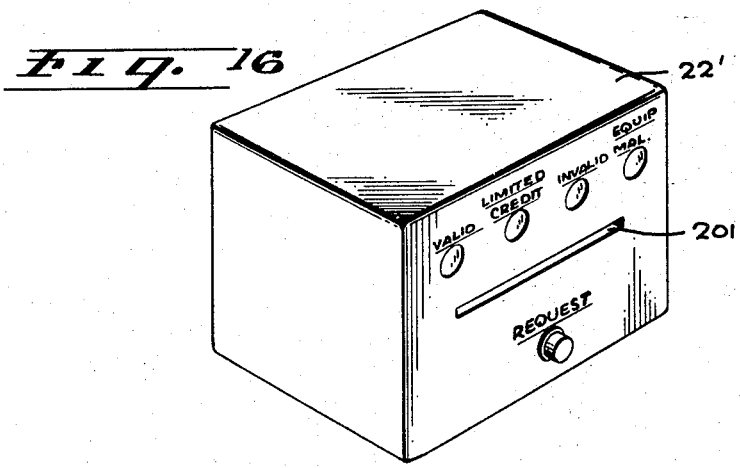
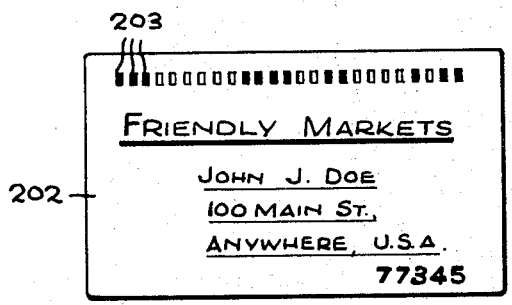
INVENTOR.
LAWRENCE S. MICHELS
BY
Warren T. Jessup
ATTORNEY

United States Patent Office 3,344,258
Patented Sept. 26, 1967

3,344,258
MATCHING IDENTIFICATION SYSTEM
Lawrence S. Michels, Inglewood, Calif., assignor to Credifier Company, Los Angeles, Calif., a co-partnership
Filed Apr. 11, 1963, Ser. No. 272,258
7 Claims. (Cl. 235—61.7)

This invention relates to matching identification systems, and is uniquely adapted to the task of checking the status of identification or credit cards when presented for such purposes. It is in this environment that a specific embodiment of the invention will be described.

It is an object of this invention to provide an identification system which can be easily and inexpensively brought up to date in the matter of numbers stored, so that at all times a current reading of the status of any and all cards or numbers dialed or otherwise put into the system may be confidently made.

It is a further object of this invention to provide a system which is fail-safe in the sense that any malfunction of the equipment will be indicated to the operator, rather than a false reading.

It is a further object of this invention to provide a system in which a continuous, and, if desired, permanent record of all transactions conducted through the matching system may be made.

It is a further object of this invention to provide a matching system which employs a coding or ciphering logic such that a false or spurious code or cipher may be instantly detected and rejected.

It is a further object of this invention to provide a matching identification system in which a plurality of similar input stations may be provided at various locations, each interrogating a single source of stored information.

It is a further object of this invention to provide such a system which is small in size, weight and in cost.

It is a further object of this invention to provide a system capable of serving a multiplicity of input stations, in which an operator at any given station is continuously advised as to whether the system is in use, i.e., being interrogated by another operator.

In accordance with these and other objects which will become apparent hereinafter, preferred forms of the present invention will now be described, with reference to the accompanying drawings. These forms of the invention relate specifically to a system having a plurality of input stations, at each of which an operator may dial or otherwise insert a number to be checked. This number is checked against a master storage system, which is rapidly scanned, and feeds back an indication of the status of the number dialed into the system. In the specific embodiment shown it will be assumed that the system is one for checking the status of a credit card, and the information returned from the storage source will indicate whether the card is vaid, invalid, or of limited credit standing.

In the drawings:

FIG. 1 is a schematic block diagram showing the system as a whole.

FIG. 2 is a circuit diagram of one of the input or interrogation stations employed in the system.

FIG. 3 is a perspective view of such an input station.

FIG. 4 is a circuit diagram of the circuit for checking the code or cipher to determine whether it is a true or a spurious code.

FIG. 5 is a circuit diagram of that portion of the system in which the comparison is made between the number dialed into the system and those numbers which are stored in the storage means of the system.

FIG. 8 is a partially symbolic perspective view of the storage and scanning portion of the system in which the tape of FIG. 6 is kept and scanned as required.

FIG. 9 is a circuit diagram of the portion of the system which starts the interrogation cycle.

FIG. 10 is a circuit diagram of a portion of the system which stores a very brief pulse long enough to generate sufficient energy to operate other portions of the circuit. The circuit in FIG. 10 is representative of storage or triggered circuits whose sole function is to permit an input pulse whose energy and duration are too small to actuate other portions of the circuit, to be in a sense amplified so that they may in turn stimulate such other portions of the circuit.

FIG. 11 is a circuit diagram of that portion of the circuit which stops the interrogation cycle.

FIG. 12 is a circuit diagram of a timer which prevents the interrogation cycle from being terminated until after all indications have been fed back to the interrogating input station.

FIG. 13 is a series of graphs illustrating the operation of the circuit of FIG. 12.

FIG. 14 is a circuit diagram of the relay circuit 28 shown schematically in FIG. 1.

FIG. 15 is a schematic diagram of a physical arrangement of the input dial at one of the interrogating input stations which, in effect, encodes or enciphers the input number into binary information on a plurality of output lines or conductors.

FIG. 16 is a perspective view of a modified form of input station suitable for accepting a coded or enciphered card rather than manual dialing in of a number by an operator.

FIG. 17 is a view of a card suitable for use in the apparatus of FIG. 16.

Figure 18:
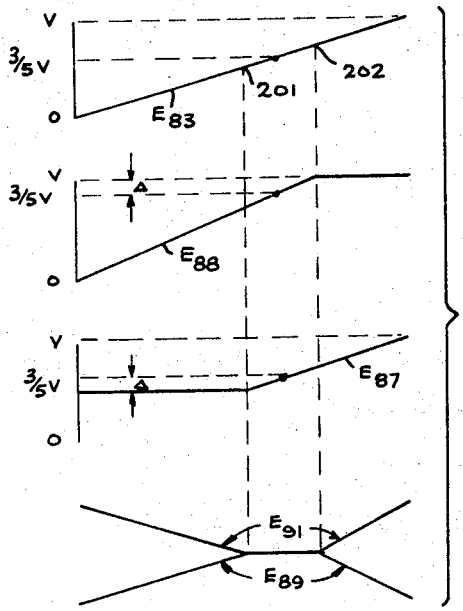

FIG. 18 shows voltage graphs illustrating the operation of the circuit of FIG. 4.

Referring now to FIG. 1, there is shown in block form the major components and subassemblies of the system.

On a tape 21 is stored, in binary form, all of the symbols or numbers which it is desired should be reflected to the interrogation units, and the status of the number. Interrogation is made from any one of a number of generally similar interrogation or input stations 22. As will be explained more fully hereinafter, the symbols stored are typically 5-digit numbers, each digit being represented in binary code by five bits on the tape. Since five bits are available for any one of the ten digits available at each position, it is possible to design the code so that each digit may be represented by an affirmative or positive signal at two and only two of the five bits. This coding makes it possible to reject spurious codes in which either more or less than two of the five bits are affirmative. To this end, a code check means 23 is employed in the system, which checks the validity of the code signal dialed in at the station 22 and permits an interrogation cycle to be instituted only if the code is of the valid, two-out-of-five type.

To interrogate and scan the storage tape 21, an operator at one of the stations 22 dials in a five-digit number, and in effect makes inquiry of tape 21 as to whether that number is recorded on the tape. Binary signals corresponding to this number are sent through the channels represented by line 24 to the code check 23. If the code is a valid code (i.e., each of the 5 digits is represented in a 2 out of 5 fashion), a start signal is applied through the channel 26 to the motor start circuit 27 which energizes the relay 28. Relay 28 energizes motor 30 to drive the looped tape 21 through one complete cycle or revolution. Operation of the start circuit 27 feeds back a hold signal through the channel 29 to maintain the code at the interrogating station during the interrogation cycle, and simultaneously voltage is removed from all of the other input stations 22, through channel 69. This inhibits all stations from further interrogations; thus two stations 22 cannot be interrogating the storage 21 at the same time.

The signal of the number or code dialed in at the station 22 by the operator is also applied through the channel 24 to a compare circuit or comparison means 31, and there it awaits signals from the photocell scanning circuit 32 to determine whether an identity is to be found. The circuit 32 consists of banks of photosensors which scan the bits on the tape 21 and feed out in rapid succession the binary signals derived thereby through the channel 33. As will be explained more fully hereinafter, the tape 21 has, for each number or symbol, a plurality of positions, each position being represented either by a punched hole or the absence of a punched hole, i.e., an opaque blocking of light. The holes (or absence thereof) are scanned optically by a radiant energy means symbolized by the light 34 and optical system 36. Signals from these bits successively sensed by the photocell circuit 32 are applied to the channel 33. The channel 33 consists of essentially five groups of conductors (one for each digit in the number) each having five leads (for the binary coding), or a total of 25 wires, carrying the binary signals to the compare circuit 31. The channel 24 likewise consists essentially of such 25 such leads, each of which carries binary signals from the interrogator 22.

If, as the photocell circuit 32 is scanning the rapidly moving tape 21, all binary signals applied through the channel 33 exactly match all binary signals awaiting in the compare circuit 33 from the channel 24, a momentary signal output or pulse is applied through the channel 37 to a status circuit 38, announcing that an identity has been achieved. Simultaneously with the reading out of each number on the tape through the channel 33, a status signal is fed out for each number through the channel 39 to the status circuit 38. If a match or identity occurs in the compare circuit 31, the signal from the channel 37 coincides with a signal from the channel 39 which identifies the status of the matched number. In the present example, three possible statuses are used, although of course more could be employed if desired. These statuses are: valid, invalid, and limited; and represent the status of credit cards, it being assumed in this particular example that the interrogating operator at the station 22 is asking the tape 21 the status of a given numbered credit card.

The occurrence of an identity and the consequent existence of a signal at the channel 37 causes the status signal from the channel 39 to be passed through the circuit 38 into the channel 41 and thence back to the interrogating station 22, where it operates an appropriate indicator, such as a light, to indicate to the operator the status of that card number.

When the tape 21 has completed a cycle, a special end-of-cycle or end-of-tape pulse signal on the tape is applied through the channel 42 to a pulse storage (lengthening) circuit 43, and thence through a channel 44 to a motor stop circuit 46, which deenergizes relay 28 and stops the motor 30. The tape 21 thereupon comes to rest. Storage circuit 43 is needed simply because the output pulses from the photocell circuit 32 are so extremely brief that they must be lengthened or stored before useful operations can be made therefrom. Generally similar functions are fulfilled in other parts of the system by similar circuitry.

The motor stop circuit 46 initiates a timing cycle in timer 47 which, after a predetermined time, for example a few seconds, momentarily kills voltage V on the line 48 that provides 28 volts to all relays in the system. This serves to drop out all relays, clearing all of the circuits and restoring them to their quiescent or pre-interrogation condition. This action clears status circuit 38 of the status which it had been holding and sending to the interrogation input station 22; clears the motor start circuit 27 and restores it to quiescent condition; and terminates the end-of-cycle pulse which had been transmitted from the photocell circuit 32 through 42 and stored at 43. This few second delay gives the operator at station 22 time to see and read out the status fed back through channel 41.

As a safety feature, a slow timing circuit is also provided in the timer 47. This timer starts when the motor 30 is started by the motor start circuit 27. If, for some reason, the end-of-cycle signal is not received through the channel 42 to shut off the motor, the slow timer operates to effect the momentary shut-off of circuit 48 which operates to kill relay power to all the circuits and return them to quiescent condition, as noted hereinbefore. The slow timer is set to operate only after ample time has been given for a normal cycle of the tape 21.

Circuitry and details of the FIG. 1 schematic will now be explained with reference to the remaining figures.

In FIG. 2, there is illustrated one of the interrogation input stations 22. Each station 22 has a plurality of, in this example 5, input dials 61, each of which may be moved to indicate any one of the 10 digits, zero through 9. Thus any number from 0 through 99,999 may be dialed into the station 22. Through any suitable technique (an example of which is shown in FIG. 15) each position is reflected into binary code by the grounding of two out of each group of five contacts 62. The grounding is effected by a pair of movable contacts 63, which are moved by the dial 61. Since there are five wires or contacts for each of the five digits, it follows that there are a total of twenty-five output terminals 64 which constitute the cable or channel 24 shown in FIG. 1.

Grounding of the selected two out of five contacts 62 is effected through a switch arm 66 of a holding relay 67 which is initially energized from a spring biased push-button switch 68 operated by the operator interrogating through the station 22. Power for the relay 67 to the start push-button 68 is supplied through a terminal and lead 69 leading to the motor start circuit 27. There is voltage V on this lead except when an interrogation is actually taking place. Depression of the button 68 picks up the relay 67, closing the contact 66 and applying ground to the movable contacts 63. Thus, two out of the five contacts 62 of each number position 61 will be grounded, which two depending upon the position of the dial 61. The relay 67 also closes its holding contact 71; thus it is capable of supplying its own holding power through a terminal and lead 29 (FIG. 1). The holding voltage applied to lead 29 is controlled from the code check circuit 23 through start circuit 27, in a manner which will be presently described. When voltage is present on the lead 29, an indicater light 72 is lit to indicate to the operators at all stations that the system is in use and is not presently available for interrogation input purposes.

After a scanning cycle has been swept by the tape 21 and a status report delivered by the status circuit 38 to the channel 41, one of three status lights 73, 74, or 76 will be lit through their respective leads 146, 144, or 137, which together constitute the channel 41. To prevent cross-energization among contacts 62, rectifiers or diodes 77 are interposed adjacent the contacts 62 which block reverse flow of current. Since direct current is used throughout the system for control purposes, the rectifiers 77 permit current to flow in only one direction. Similarly, a rectifier 78 prevents the feeding of power back to the terminal 69, which might accidentally give power to other stations should an operator who captures the interrogation circuit keep his button 68 depressed. As noted, power on the circuit 69 is lost during an interrogation cycle. Rectifier 78 is needed to prevent the accidental application of power to these disabled input stations 22 which are not in use. The rectifiers 79 prevent the lights 73, 74, and 76 from being energized in series through each other. For ease of identification, the lights 73, 74, and 76 are preferably different colors, as for example, red, amber, and green, respectively.

When the relay switch 66 closes, as noted hereinbefore, two out of each of the five contacts in the group of contacts 61 is grounded. The twenty-five lines, representing the total of the binary outputs from the interrogation station 22, are led in the form of the channel or cable 24 to the code check circuit 23 shown in detail in FIG. 4. Each group of five binary leads 64 is applied to a voltage divider network consisting of resistors 81 in series with resistors 82, with the input signals (either ground or open circuit) being applied to the connections between the two resistors. The network is such that at its output terminal 83 the voltage will be inversely related to the number of input terminals 64 which are grounded. It will be readily seen that if all of the terminals 64 are grounded, then the output at 83 will also be substantially grounded. If none of the terminals 64 is grounded, it is readily evident that the output at 83 will be substantially the input voltage V applied to the voltage input terminal 84. Since, in the present system, a valid code consists of two and only two grounded lines, the only valid output voltage at 83 will be about $\tfrac{3}{5}$V.

In order to sense a departure from $\tfrac{3}{5}$V at terminal 83, a differential amplifier 86 is connected thereto. This amplifier has the attribute of amplifying the difference in voltage appearing at its two input terminals 87 and 88 and causing this to appear, amplified, as an output voltage across its output terminals 89 and 91. Reference differential voltages are constantly applied to the amplifier 86 from the terminals 92 and 93. The voltage at 92 is $\tfrac{3}{5}$V minus delta, and at 93 is $\tfrac{3}{5}$V plus delta.

The value of delta is chosen to be sufficiently small that it will detect a difference of one complete contact or closure at the input terminals 64, but it is still sufficiently large to accommodate manufacturing tolerances.

The reference voltage at 92, acting through the rectifier 97, insures that terminal 87 can never go below $\tfrac{3}{5}$V minus delta. Similarly, the reference voltage at 93 applied through the rectifier 98 assures that the voltage at the input terminal 88 can never go above $\tfrac{3}{5}$V plus delta.

The voltage at 87, however, can go above $\tfrac{3}{5}$V minus delta if such a potential is applied at 83, because current will then flow through the rectifier 99 and cause a voltage drop in a resistor 101 as it flows to ground. Similarly, the voltage at 88 can go below $\tfrac{3}{5}$V plus delta should the input voltage at 83 drop below that figure, because current can then flow from the input voltage V dropping in potential through the resistors 102 and thence flow through the rectifier 103 to the terminal 83.

The graphs of FIG. 18 illustrate voltage conditions in the output circuitry of the differential amplifier 86 as the voltage at 83 moves from zero to its maximum V. When the voltage at 83, $E_{83}$ is zero, the voltage at 88, $E_{88}$, is likewise zero. The voltage at 87, $E_{87}$, however, is held up by terminal 93 to $\tfrac{3}{5}$V minus delta. As $E_{83}$ rises, and neglecting voltage drops across the diodes, $E_{88}$ follows until $E_{83}$ reaches point 201, or a value of $\tfrac{3}{5}$V minus delta. At this point $E_{87}$ rises, along with $E_{88}$ and $E_{83}$, and the three voltages are all equal. At point 202, when $E_{83}$ attains a voltage of $\tfrac{3}{5}$V plus delta, the terminal 93 takes over control of $E_{88}$ and prevents it from going any higher. Thereafter, $E_{83}$ and $E_{87}$ rise together to the maximum voltage of V, while $E_{88}$ remains stable at $\tfrac{3}{5}$V plus delta.

As noted hereinbefore, the voltage at 83 can be anything ranging from zero to V, depending on the number of terminals 64 (FIG. 4) which are grounded.

It will be noted from FIG. 18 that $E_{87}$ is always higher that $E_{88}$, except in the region of $\tfrac{3}{5}$V plus or minus delta. The voltages at terminals 89 and 91 being a function of the difference between the inputs at 87 and 88, it is seen from the bottom graph in FIG. 18 that $E_{91}$ steadily decreases as $E_{83}$ increases, then levels off in the region $\tfrac{3}{5}$V plus or minus delta, and thereafter starts to increase. Conversely, $E_{89}$ steadily increases until the region of $\tfrac{3}{5}$V plus or minus delta is attained, and thereafter decreases with further increase in $E_{83}$.

The voltage at 91 is applied to the base of PNP transistor 203, while the voltage at 89 is (effectively) applied to the emitter thereof. As long as the emitter is below the base, the transistor will not conduct. When the emitter voltage exceeds the base slightly then the transistor will conduct, and the voltage at 91 will be felt on the collector of the transistor 203. In order to insure that the transistor 203 will conduct, the voltage applied to the emitter is raised slightly above the potential 89 by tapping into the input resistor 204 of the differential amplifier 86 at point 206. This insures that in the region from $\tfrac{3}{5}$V plus or minus delta, the voltage at 206 will not only equal but will actually slightly exceed the voltage at 91, thereby insuring conduction of the transistor 203.

As long as transistor 203 is non-conducting, its collector is effectively grounded, thereby blocking the following transistor 207. When the transistor 203 conducts, voltage 91 is in effect applied to the base of transistor 207, causing it to conduct and energize the relay 94, which causes its arm 104 to close, thereby closing terminals 105.

It is thus seen that the arm 104 will be open at all times except when the input voltage at 83 is in the range $\tfrac{3}{5}$V plus or minus delta.

As noted hereinbefore, grounding of two of the five terminals 64 produces an output voltage at 83 equal to $\tfrac{3}{5}$V. The provision of the range represented by plus or minus delta provides for manufacturing tolerances. When the system is energized but not being used to interrogate the storage means, all of the terminals 64 are open circuited (at arm 66, FIG. 2), and therefore the terminal 83 resides at potential V from the terminal 84. This, as explained hereinbefore, produces a differential voltage between 91 and 89 which blocks the transistor 203 and keeps the relay 94 unenergized.

One of the relay output terminals 105 is connected to the system voltage V, while the other goes to the output terminal 26 of the code checking means 23, and thence to the start circuit 27, as shown in FIG. 1.

Each group of five binary input terminals 64, as shown in FIG. 4, has its own resistance network 81, 82 and rectifier network 99, 103, but the differential amplifier 86 together with its output circuitry is common to all five numerals or digits, and hence there are only two common differential input terminals 87 and 88, to which each of the five circuits is fed.

The compare or comparison circuitry 31 of FIG. 1 will now be described in detail with reference to FIGS. 5 and 6.

Each of the twenty-five leads represented by the input channel 24 is applied, as shown at 64, to a divider network consisting of the resistor 81 (previously described in connection with FIG. 4) and a resistor 107. It will be understood that the resistor 81 in FIG. 5 is exactly the same component as the resistor 81 in FIG. 4. The two functions of code check 23 and compare 31 have been shown separately in FIG. 1 for schematic purposes, but in point of fact the physical circuitry is contained in a single chassis. At each end of the series-connected network 107, 81 is connected a reference voltage, the lower end in FIG. 5 being terminal 84 hereinbefore described, and the upper end being a terminal 108. It will be readily understood that in fact terminal 108 is the same as terminal 84, but for ease of description will be assumed to be a different terminal. Each input wire 64 is connected to the mid-point of its network 107, 81. In series with the resistor 107 is a light sensitive or photodiode 109 is actually contained in the photocell circuit 32 (FIG. 1) and is positioned so that it may scan the positions (holes) in the tape 21 through the scanning light 34.

Figure 6:
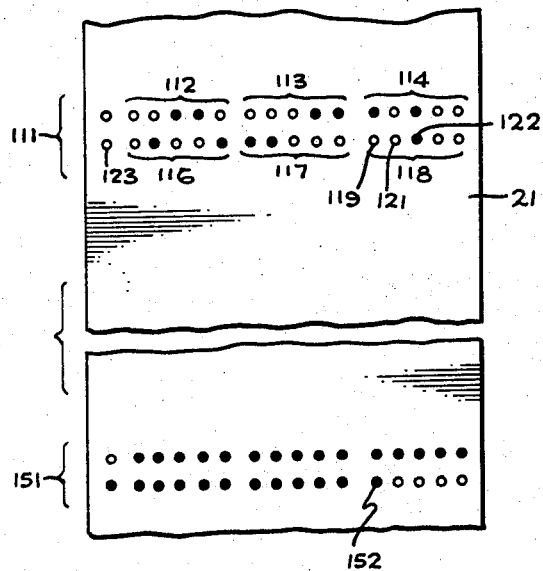
FIG. 6 is a fragmentary view of a punched tape employed as the storage medium or vehicle in the system.

A section of tape 21 is shown in FIG. 6. Each card number is represented by the double row of holes, or positions, shown at 111. In FIG. 6, the unfilled circles represent positions which are not punched out of the tape, while the black or filled-in circles represent holes which are punched in the tape and which therefore permit light to pass.

The group 112 of five holes represents in binary form the first digit in the total number. Similarly 113 represents the second digit, 114 the third digit, 116 the fourth digit and 117 the fifth digit. The last group of five holes 118 contains the status code, position 119 representing valid status, 121 representing limited status, and 122 representing invalid status. The coding which has been adopted is as follows: For the numeral "1," positions 1 and 2 will be punched out; for the numeral "2," 1 and 3; for the numeral "3," 2 and 3; for the numeral "4," 2 and 4; for the numeral "5," 3 and 4; for the numeral "6," 3 and 5; for the numeral "7," 4 and 5; for the numeral "8," 1 and 4; for the numeral "9," 1 and 5; for the numeral "0," 2 and 5. Thus, for example, the five digit number represented in FIG. 6, is 57201, and the hole or punching out at the position 122 indicates that that particular number has an invalid status. The position 123 is an end-of-scan or end-of-tape indicator, which is punched out to signal the equipment to shut off and stop at the quiescent or start position.

Returning now to FIG. 5, assume that a terminal 64 is grounded by being connected to ground by the contact 63 (FIG. 2). If there is no hole at that particular position of the tape 21, then point 126 is in effect isolated from potential at terminal 108, since the photodiode 109 is not conducting. This will effectively place point 126, which is the base of transistor 127, at ground through 107. The emitter 128 of transistor 127 will follow the base, and therefore, the output terminal 37 of the compare circuit 31 will be grounded.

If now it be assumed that the terminal 64 remains grounded, but the tape 21 is in a position where a hole is opposite the light sensitive diode 109, the diode will conduct and the voltage at 108 will be applied to the point 126. The base of the transistor 127 will be raised in potential, with consequent appearance of an output potential at terminal 37.

Assume now that the terminal 64 is open circuited and that the tape 21 is at a blank spot, so that the light sensitive diode 109 is not receiving light and is hence open circuited. This will in effect place the transistor base 126 at elevated potential through the resistors 81 and 107. The output at 37 will likewise be at elevated potential.

For the fourth and last possible condition, assume that the terminal 64 is open circuited and that the light sensitive diode 109 is conducting, being opposite a hole in the tape 21. In this event potential will be applied to point 126 both from the terminal 108 and the terminal 84; and in any event, the emitter 128 will be at elevated potential, as will the output terminal 37.

It is thus seen that, of the four possible combinations represented by ground or open circuit at 64 and open or closed circuit at 109, only one will produce a ground at 37. That one condition is a ground at 64 and an absence of light (open circuit) at 109. The other three possible conditions will each produce an output voltage V at 37.

As noted, two and only two of the five terminals 64 in each digit group are grounded. In order to maintain voltage at point 126, it is necessary that the circuits corresponding to these two grounded terminals must have light on their respective light sensitive diodes 109. Since, in the normal coding group, for example group 112, only two of the five positions can have holes, it follows that only an identity in number between the number coded in at 112 and the number put in by the operator at the station 22 can produce a voltage at point 126. If any of the twenty-five circuits, of which the circuit in FIG. 5 is an example, has a ground at 126, the single output terminal 37 will be grounded. Thus, all five digits or numerals 112–117 must find an identify in number in order to maintain potential V on the output terminal 37, which feeds to the status circuit 38.

Restated in other words, of the twenty-five terminals 64, ten will be grounded. On the tape 21, the twenty-five digit groups 112–117 will have ten, and only ten, holes. These ten holes must match up with the ten grounded terminals 64, or else at least one of them will have pulled its output emitter 128 down to ground, with consequent grounding of the output terminal 37. Therefore, in order for an output voltage to be transmitted from the compare circuit 31 (FIG. 1) to the status circuit 38, through the channel 37, the five digit number dialed in at the input station 22 must appear at one of the position groups 111. If, in the rapid scan of the tape 21, such a number or code does pass the scanning diodes 109, there will be a momentary output pulse of voltage applied to the status circuit 38 from the compare circuit 31 through channel 37. Simultaneously therewith there will be applied, through the channel 39, a status signal indicating which of the holes in the group 118 is punched out. Channel 39 actually consists of three conductors 131, 132, and 133, one for each of the positions 119, 121 and 122. Hence, when an identity is encountered, there will be applied a momentary pulse to the single lead 37 indicating that an identity has been encountered, and simultaneously one of the three leads represented by the channel 39 will also have a signal from one of the positions in the group 118, to indicate what the status of that identified card or input number is.

Figure 7:
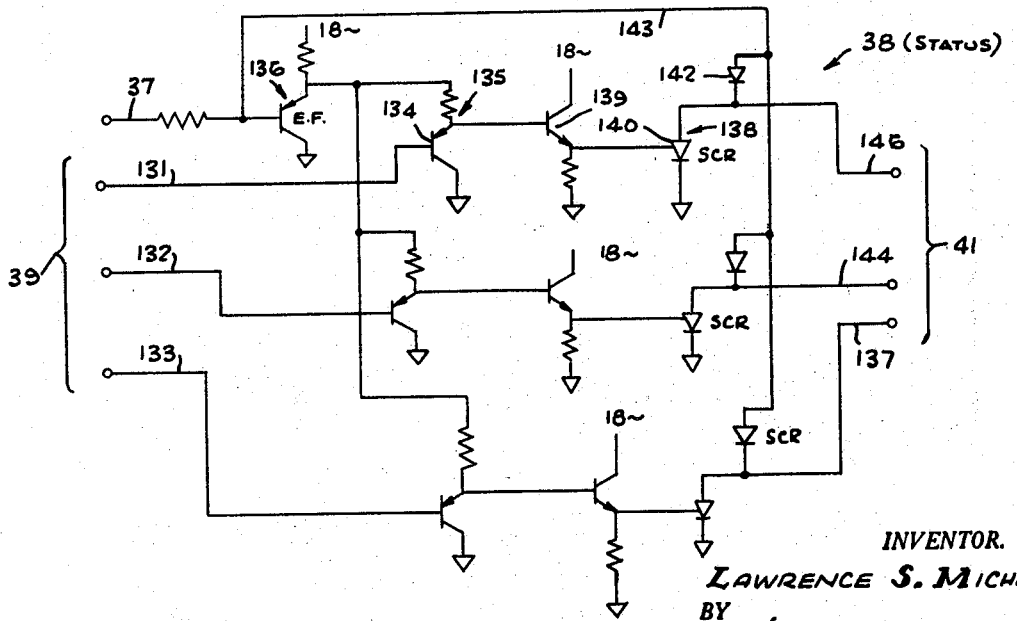
FIG. 7 is a circuit diagram of that portion of the system which sends back a signal to the interrogation station giving the status of the number dialed in by the operator at the input station.

The operation of the status circuit 38 will now be described in detail with reference to FIG. 7.

Each time that the photosensor 32 scans a given position group 111, a status pulse from the group 118 is applied to one of the three conductors 131, 132, or 133. Taking the conductor or terminal 131 as an example, such a pulse (positive going) appears on the base 134 of transistor 135. However, there will be no output unless there is also voltage applied to the emitter of 135 from the emitter follower 136. The emitter follower 136 will have an output only when there is a pulse on the input 37 from the compare circuit 31. Therefore, in spite of the progression of continual status signals through the channel 39, there will be no output until one such status signal coincides with a compare signal at 37.

When this occurs, the emitter follower 136 applies the pulse from terminal 37 to the emitter of transistor 135. The coincidence of this pulse with the pulse at 131 applies a pulse to the input 140 of the silicon controlled rectifier 138, through an isolating transistor 139. A pulse once applied at 140 keeps the silicon control rectifier 138 conducting as long as current passes therethrough. Such current flows from the input station 22 which is doing the interrogating, through the conductor 146 contained in the channel 41, and thence to ground through the silicon controlled rectifier 138. Reference to FIG. 2 will show that such a current flowing from the terminal 29 and through the closed relay contact 71 will energize the "invalid" light or indicator 76, and thence reach ground through the conductor 146. Thus, the operator at the input station 22 knows that the code number which has been identified is an invalid credit number, since the light 73 is so denominated.

In order to inhibit further indications in that scanning cycle, should the same number be later encountered in tape 21, an inhibiting line 143 is connected to each of the terminals 146, 144, and 137, and leads back to the input of the emitter follower 136, grounding it and rendering ineffective further matching signals on terminal 37. This grounding is effected through diodes represented at 142. Such an inhibiting circuit is required because a situation may arise where a given number has been punched into the tape 21 as invalid. Later on, the number is validated and it is desired to so indicate. Rather than having to repunch or doctor the tape 21 in any way, the number is simply again punched into the tape—this time with a valid code. By running the tape 21 past the photosensors 32 in inverse chronology, the latest status will always be read out first, and any previously inserted different status will be blocked out by the inhibit line 143.

The three lines 137, 144 and 146 together constitute the channel 41 leading back to the interrogation station 22 to energize respectively the lights 76, 74 and 73.

A somewhat schematic idea of the physical arrangement of the scanning apparatus is to be found in FIG. 8, which shows the loop of tape 21 in quiescent position, ready to be rapidly driven by the motor 30, so that all of its punched holes may be scanned by the multiplicity of light sensitive diodes constituting the photosensor 32.

In FIG. 9, there is illustrated the circuitry of the start circuit 27. From the controlled or system voltage V, the line 69 is supplied with power during the standby or quiet period when the system is not in use. The voltage V on the line 69 thus stands available at the pushbutton 68 (FIG. 2), ready to institute an interrogation cycle whenever any one of the operators at the stations 22 desires. When a cycle is thus initiated, it energizes the relay 67 which supplies voltage V to the line 29, through the holding contact 71 of the relay 67. Through the relay 104 (FIG. 4) the line 26 is supplied with voltage V and this energizes the relay 151. Operation of relay 151 applies voltage V to a relay 153, the contact 154 of which operates to remove power from the line 69 and apply holding voltage to the relay 153 itself. Removal of voltage from the line 69 prevents any other station 22 from instituting an interrogation cycle until after the current cycle has been completed. Operation of the relay 153 applies voltage to the output line 25 of the start circuit 27.

Voltage from the line 25 of the start circuit 27 is applied to the relay circuit 28 shown in FIG. 14. Here it passes through a relay coil 157 and thence to the line 45 and over to the stop circuit 46 shown in FIG. 11. In the stop circuit the line 45 finds ground through the normally closed contact 158.

This action of energizing the relay coil 157 (FIG. 14) closes its contact 161, applying operating power of 120 volts to the motor 30, which is connected to drive the tape 21 and effect a scanning cycle.

When a scanning cycle has been completed, a very brief end-of-cycle pulse is applied through the line 42 to the pulse storage 43 shown in FIG. 10. This circuit consists simply of a buffer amplifier 162 which receives the momentary pulse at 42 and applies it to a silicon controlled rectifier 163, which grounds the line 44 leading from the stop circuit 46 (FIG. 11). This energizes the relay 159, opening the ground on line 45 and applying voltage V to the line 40 leading to the timer 47. Opening of the contacts 158 and removal of ground from line 45 de-energizes the motor relay 157 (FIG. 14) and thus opens the circuit to the motor 30.

Application of voltage to the line 40 institutes a fast timing cycle in the timer 47, which will now be described with reference to FIGS. 12 and 13. Voltage applied to the terminal 40 starts a charging cycle in the capacitor 166 at the time 167 (FIG. 13). By the time the voltage on the capacitor 166 has built up to the point 168, there is sufficient voltage on the uni-junction transistor 169 to apply a pulse to the transistor 171, energizing the relay 172 and opening its contact 173. The transistor 171 is held conducting during the rapid discharge of the condenser 166, to the point 174, at which time the transistor 171 again opens circuits, de-energizing the relay 172 and reclosing the contact 173. The momentary opening of the contact 173 correspondingly removes the 28 volts at terminal 176 from the voltage circuit V, shown at 177. This de-energizes all of the circuits and holding relays throughout the system. The pulse of current through the relay 172 is shown at 178 in FIG. 13.

As a safety feature, the timer 47 also has a slow timing circuit, which receives voltage from the line 25, this being the same voltage that energizes the motor relay circuit 28. Voltage from 25 is applied to a long time constant RC circuit which charges the capacitor 181 at a slow rate starting at the point 182 (FIG. 13). Well before the charge on capacitor 181 has built up to the point where it can fire the uni-junction transistor 169, the cycle will normally have been completed by the rising of voltage at 168. Thus the actual voltage applied to the uni-junction transistor 169 will, in the typical case, appear as in the graph 183, wherein at point 184, the slow charge voltage applied from the capacitor 181 is abruptly augmented by the rapid charge applied from the capacitor 166. This has the advantage that at the point 186, the conduction of the uni-junction transistor 169, while dumping the charge from the capacitor 166, also picks up the capacitor 181 and discharges it down to the point 174, as shown in FIG. 13.

If something should go wrong in the shutoff mechanism initiated through the line 42, then the slow timing circuit would continue to build up a charge across the capacitor 181 until the point 191 is reached, at which point the uni-junction transistor, now having its trigger voltage attained, would conduct, applying a brief shutoff pulse to the relay 172 and killing the system voltage V.

The switch 161 which converts the 10 decimal numbers into a 2 out of 5 binary code is shown in FIG. 15. The stationary contacts are in the form of arcuate segments 62. The dial 61, set by the operator, has a pair of contacts angularly spaced as shown, so as to contact 2 of the 5 segments 62. Each of the segments 62 leads to one of the output lines 64. The angular separation between the two contacts 63 is such that as the dial 61 is rotated to the numbered positions shown at 191, the binary coding is effected.

With the pointer at numeral "1," the two contacts 63 engage segments of line 64 numbered 1 and 2. With the pointer 192 at the numeral "2," the contacts 63 engage the segments numbered 1 and 3; and so on through the entire 10 decimal digits, in accordance with the code described hereinbefore.

A refinement to the present invention involves the use of an input station 22 which, instead of having dials, has a slot 201 into which is inserted a specially coded credit card 202 carrying its number in the form of bits or dots 203. The dots 203 correspond to the positions or holes in the tape 21 and directly close the circuit 62, 63 within the apparatus 22. The special 2 out of 3 code of the present system makes it impossible to alter a number originally coded into the card 202 by punching additional holes 203, because then there would be more than 2 out of the 5 of each digit which are punched, and thus the code check 23 would reject the card as having a spurious code.

A typical use of the present invention will now be described. Assume by way of example that the input stations 22 are located at the checkout stands of a supermarket and are used to enable the checker to determine whether a given credit card is valid or is invalid.

The operator dials the five digits of the credit card number into an input box 22, shown in FIG. 3, by turning the dials 61 until the number of the card is registered therein. The operator then presses the start button 68, which institutes the scanning cycle of the tape 21 as described hereinbefore.

If by a very unusual coincidence, two operators should press their start buttons 68 simultaneously, then the code check 23 would refuse to start a scanning cycle, because more than 2 out of 5 of the contacts 62, 63 would be closed, and this would reflect as a spurious code.

If the number is not stored in the tape 21, the cycle will be run without encountering the number, and the scan will thereupon come to the last row shown at 151 in FIG. 6. Here, all of the holes indicating coded numbers are punched out, so that irrespective of what number is dialed into the input station 22, the compare circuit 31 will reflect an identity, and an output pulse will be applied to the output terminal 37. It will be noted that this last row 151 has in its identity group 118 a hole at the valid position 152. Thus, the end of scan will automatically effect an identity signal coupled with a valid signal which will be transmitted back to the checkstand station 22 and will light up the valid light 76. The operator will thus know that the particular number, being a valid code (as passed by 23), and not being punched into the tape 21, is still a valid card.

Assume now, that the number of the card has been punched into the tape with an invalid designator. The moment the tape 21 passes that point in the scan, an identity will be achieved, and a pulse will appear at the terminal 37, which will coincide with an "invalid" signal pulse in the channel 39. These two pulses together provide an output to the invalid line 146 to energize the light 73 and show the operator that that card is invalid. By virtue of the timer 47, light will remain on long enough for the operator to read it. Thereupon the timer 47, acting through the momentary shutoff arm 173, kills voltage V and de-energizes all of the circuit elements, including the input stations 22. This extinguishes all lights.

The present invention has the advantage that a match for large blocks of numbers may be induced in the compare circuit 31 at a single reading merely by punching more than two holes in any group of five bits representing the five digits in the number. Assume, for example, that it is decided to invalidate all of the cards in the thirty, forty or fifty thousand series. That is to say, all numbers in which either three, four or five appears in the fifth position from the right. It is merely necessary to punch in at one of the reading stations 111 in the tape 21 the following: All five holes are punched out at each of the sections 117, 116, 114, and 113. At station 112, positions 2, 3, and 4 are punched out. This means that no matter what number is coded in at 113, 114, 116, or 117, an identity will be indicated whenever positions 2 and 3 are grounded (the numeral "3"); whenever positions 2 and 4 are grounded (the numeral "4"); or whenever the positions 3 and 4 are grounded (the numeral "5"). Thus, in a single reading, an entire block of 30,000 numbers may be identified as having a peculiar preassigned status.

What is claimed is:

1. A system for investigating the status of a selected one of a plurality of identification symbols comprising:
    storage means having a storage capacity less than the total number of identification symbols;
    means for introducing identification and status symbols into said storage means as the status becomes relevant to the investigation;
    scanning means for scanning the identification symbols stored in said storage means and deriving identification symbol and status symbol signals therefrom;
    comparing means having means for receiving two signals to be compared for generating an output signal upon the matching of the two input signals received;
    means for applying the identification symbol signals derived from said storage means to one of the signal receiving means of said comparing means;
    input means for generating an identification symbol signal corresponding to the identification symbol selected to be investigated;
    means for applying said generated identification symbol signal to the other of the signal receiving means of said comparing means; and
    readout means connected to said scanning means for receiving the derived status symbol signal, said readout means being enabled by the output signal from said comparing means.

2. A system in accordance with claim 1 wherein said scanning means scans said storage means in inverse chronological order.

3. A system in accordance with claim 2 wherein said scanning means is cyclic in operation and wherein said readout means includes means responsive to the first match of said identification symbol signals for inhibiting said readout means for the remainder of the scanning cycle.

4. A system in accordance with claim 1 wherein the identification and status symbols are stored on a permanent record in said storage means.

5. A system in accordance with claim 4 wherein the scanning means is cyclic in operation and scans said storage means in inverse chronological order and wherein readout means includes means responsive to the first match of said identification symbol signals for inhibiting said readout means for the remainder of the scanning cycle.

6. A system in accordance with claim 1 wherein said input means includes a plurality of input stations and means responsive to the generation of an input symbol signal at one of said input stations for inhibiting the generation of an input symbol signal at another of said input stations during the scanning of said storage means.

7. A system in accordance with claim 1 wherein said input means generates an identification symbol signal in response to the insertion therein of a coded card and wherein said readout means includes means for indicating the insertion of an invalid code into said input means.

References Cited

UNITED STATES PATENTS

| | | | |
|---|---|---|---|
| 2,900,132 | 8/1959 | Burns et al. | 235—61.7 |
| 3,030,609 | 4/1962 | Albrecht | 340—172.5 |
| 3,069,496 | 12/1962 | Blinken et al. | 235—61.11 X |
| 3,085,230 | 4/1963 | Shoultes et al. | 340—172.5 |
| 3,135,945 | 6/1964 | Swanson | 340—146.1 |
| 3,166,736 | 1/1965 | Heminger | 340—172.5 |
| 3,167,740 | 1/1965 | King et al. | 340—146.2 |
| 3,169,168 | 2/1965 | Capranica. | |
| 3,184,714 | 5/1965 | Brown et al. | 340—146.1 X |
| 3,196,260 | 7/1965 | Pugmire | 235—173 |
| 3,205,480 | 9/1965 | Simjian | 340—146.2 X |
| 3,208,042 | 9/1965 | Haigh et al. | 340—146.1 X |
| 3,212,062 | 10/1965 | Goldman et al. | 340—172.5 |

MALCOLM A. MORRISON, *Primary Examiner.*

M. P. ALLEN, M. P. SPIVAK, *Assistant Examiners.*